June 24, 1969   T. B. LUDLOW   3,451,273
SPECIFIC GRAVITY TESTER DEVICE
Filed Jan. 17, 1968

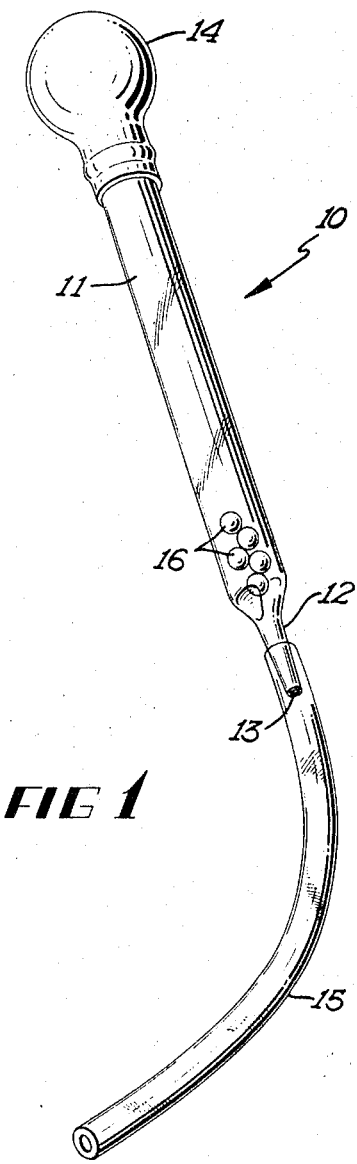
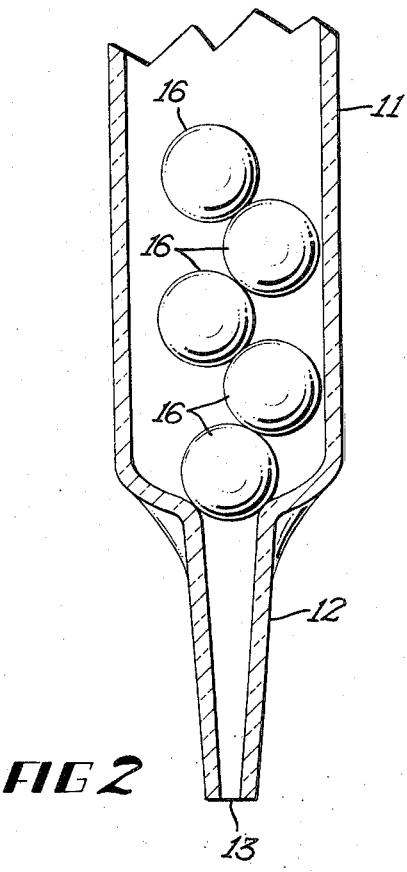

INVENTOR.
THOMAS B. LUDLOW
BY Williamson, Palmatier
& Bains
ATTORNEYS

United States Patent Office

3,451,273
Patented June 24, 1969

3,451,273
SPECIFIC GRAVITY TESTER DEVICE
Thomas B. Ludlow, 1515 Edgewater Ave.,
St. Paul, Minn. 55112
Filed Jan. 17, 1968, Ser. No. 698,569
Int. Cl. G01k 3/00
U.S. Cl. 73—440                                       6 Claims

ABSTRACT OF THE DISCLOSURE

A device for measuring the specific gravity of liquid solutions, such as antifreeze, and including a transparent tubular chamber having an opening in one end and having a flexible bulb secured to the other end for causing fluid to be drawn through the opening. A plurality of indicator balls each being formed of polyolefin and filler materials. The amount of polyolefin and filler material by weight in each indicator ball being such that the specific gravity of the ball will be substantially the same as the specific gravity of the liquid being tested. Each ball also having substantially the same thermal expansion and contraction characteristics as the specific strength solution to be tested. The specific gravity of each ball being different from the specific gravities of every other ball whereby a wide range of different strength solutions may be tested.

---

Although hydrometers or specific gravity testers are available for testing and indicating the strengths of automotive coolant antifreeze solutions, most of these prior art hydrometers or testers are not capable of relatively accurate indications. No provision is made in most of these prior art devices for compensating for changes in the temperature of the liquid being tested, except through use of scale correction devices, supplementary correction charts, the necessity of accurately reading a thermometer in the testing device, etc. All of these techniques are tedious and conducive to an operator's error. Damage, of course, can result from erroneous indications of the strength of the antifreeze solution which is being tested.

It is, therefore, a general object of this invention to provide a novel specific gravity tester which is provided with temperature compensating indicator balls to thereby permit accurate determination of the strength of the solution being tested.

Another object of this invention is to provide a novel and improved specific gravity tester, which is of simple and inexpensive construction, and which is especially adapted for use in accurately testing the specific strength of antifreeze solutions.

Another object of this invention is to provide a specific gravity testing device for use in testing antifreeze solutions, which includes a plurality of temperature compensating indicator balls, each having a different specific gravity which is substantially the same as a predetermined strength antifreeze solution whereby a wide range of different strengths solutions may be tested.

These and other objects and advantages of this invention will more fully appear from the following description made in connection with the accompanying drawings wherein like reference characters refer to the same or similar parts throughout the several views, and in which:

FIG. 1 is a perspective view of the specific gravity tester device.

FIG. 2 is a cross-sectional view of an enlarged scale of a fragmentary portion of the testing device.

Figure 3:
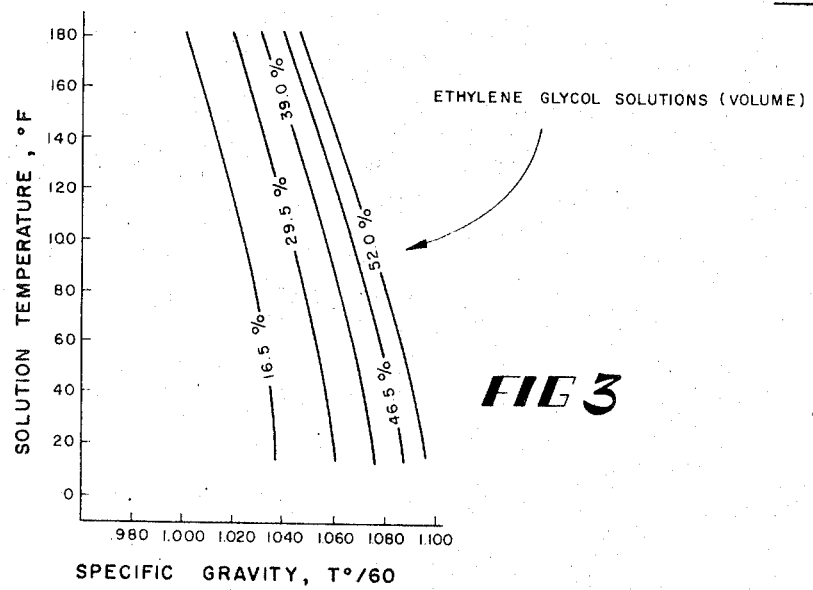
FIG. 3 is a specific gravity-temperature performance graph for different strength ethylene glycol solutions (percent by volume).

Referring now to the drawings and more specifically to FIG. 1, it will be seen that one embodiment of the novel specific gravity tester or hydrometer, designated generally by the reference numeral 10, is thereshown. This specific gravity tester 10 comprises an elongate tubular transparent chamber 11 which is preferably constructed of glass and which has a reduced tapered lowered end portion 12. This tapered lowered end portion 12 has an opening 13 therein which communicates with the interior of the chamber 11. The upper end portion of the chamber 11 has a bulb-like member 14 secured thereto in telescopic relation therewith in a well-known manner. This bulb-like member 14 is formed of a yieldable resilient material, preferably rubber or the like and when collapsed and expanded serves to permit fluid to be drawn into the interior of the chamber 11.

Since the specific gravity tester 10 is especially adapted for use in testing antifreeze solutions, one end of an elongate flexible conduit is secured in telescopic fashion to the tapered lower end portion 12 of the chamber 11. With this arrangement, the flexible conduit 15 may be inserted into the radiator of an automobile to facilitate removal of antifreeze solution therefrom. The means for indicating the strength of the antifreeze solution being tested comprises a plurality of indicator balls 16 which are of substantially identical size and shape, preferably spherical, each ball having a different specific gravity than every other ball of the tester. In the embodiment shown, five such indicator balls are provided, each having a specific gravity corresponding to a specific strength of an antifreeze solution.

Referring now to FIG. 3, it will be seen that the graph illustrated therein shows the performance curves of different strength ethylene glycol solutions in water (commercial antifreeze) indicating the change in density of these solutions as the temperature changes. Note that the terms "density" and "specific gravity" are used when referring to plastic compositions, and glycol solutions, respectively. Since we are relating specific gravity to the density of water at 60° which is approximately 0.999 gm./cc., there is negligible error in using the terms "density" and "specific gravity" synonymously. In FIG. 3, it will be noted that the density or specific gravity for a 39% volume ethylene glycol solution in water varies from 1.050 to 1.077 in a temperature range of 20 degrees F. to 180 degrees F. This temperature range is a range of temperatures that the engine coolant might be subjected to during operation of the engine. Thus it will be seen that since the density or specific gravity of the various strength ethylene glycol solutions varies in response to the change in the temperatures of the solutions, it is necessary to provide the indicator balls with temperature compensating characteristics in order to obtain an accurate indication.

Therefore, the indicator balls must be constructed of a composition formulation which will have exactly the same expansion-contraction characteristics at varying temperatures as do the different strength antifreeze solutions. It has been found that hydrometers made from inorganic compositions, such as metals, glass, ceramics and the like, are unusable because their expansion-contraction characteristics are negligible over the temperature range which is being considered. On the other hand, polyolefins, such as low density polyethylene and polypropylene are ideally suited since these materials do have expansion and contraction characteristics quite similar to that of ethylene glycol, and these materials also have other desirable characteristics for this use, such as high melting point, good physical strength, chemical inertness, resistance to glycol solutions, and the like.

Figure 4:
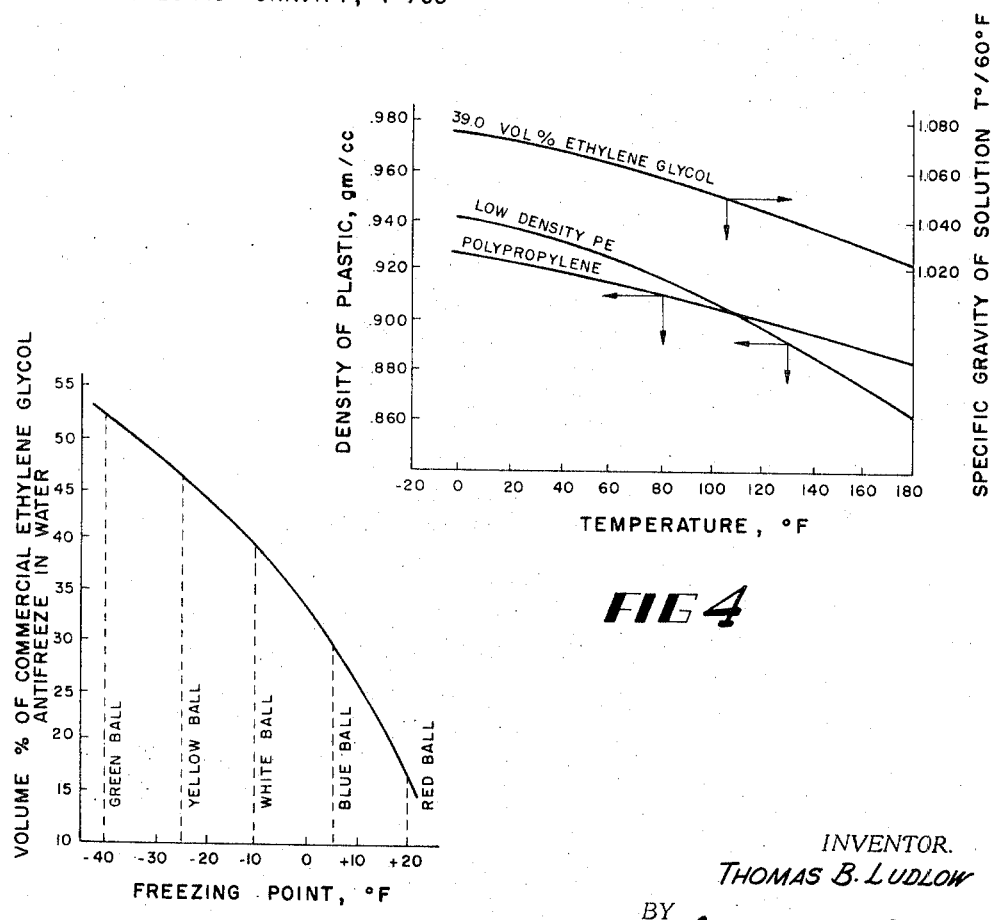
FIG. 4 is a temperature density performance graph illustrating a comparison of the densities of low density polyethylene and polypropylene with the density of 39% volume ethylene glycol solution.

Referring now to FIG. 4, it will be seen that 39% volume ethylene glycol solution has been selected for examplary purposes, to indicate expansion-contraction characteristics as the temperature of the solution varies. It will be also noted that low density polyethylene (LDPE) and polypropylene (PP) both have expansion and contraction characteristics which vary in response to changes in temperature. It will be further noted that the expansion-contraction characteristic curves for low density polyethylene and polypropylene, while being somewhat similar in shape to the corresponding curve for the 39% solution of ethylene glycol, have somewhat different slopes from the curve for ethylene glycol. However, by combining the two materials, a composition material may be developed which has a curve substantially identical to the curve of 39% solution of ethylene glycol.

The densities of polypropylene and low density polyethylene, as indicated in FIG. 4, are substantially less than the density of a 39% volume of ethylene glycol over the temperature range being contemplated. If an indicator ball is to be developed which has a specific gravity or density that corresponds to the specific gravity or density of a 39% solution of ethylene glycol within the temperature range being considered, it is therefore necessary to add some material to the polyolefin to increase the density of the indicator ball. This additive material may have a relaitvely constant density or specific gravity in the temperature range. It has been found that hydrated alumina with a density of 2.40 and titanium oxide with a density of 4.20 are ideally suited for this purpose. It is also desirable to add a colorant or pigment to the indicator balls so that each ball may be readily identified with respect to its specific gravity or density. It is pointed out that the titanium oxide may be omitted and the hydrated alumina used as the filler or ballast material. Titanium oxide also imparts an opaque white color to the composition. If this titanium oxide is blended with other dyes or pigments, one may obtain pastel shade colors which is desirable in some instances.

Since the density of the indicator balls will be dependent upon the concentration of the constituents of the balls, it is necessary to calculate the concentrations of the constituents to arrive at a temperature compensating composition. It has been found that in compositions of this nature, there is negligible solubility of one component or constituent in the other, so that at a given temperature each has substantially the same volume in the mixture as it would by itself. This formulation may be expressed mathematically as follows:

$$\frac{W_{TiO_2}}{D_{TiO_2 t}} \frac{W_{Al_2O_3}}{D_{Al_2O_3 t}} \frac{W_{LDPE}}{D_{LDPE t}} \frac{W_{PP}}{D_{PP t}} = \frac{W\ Total}{D\ Composition_t}$$

where $W$ and $D$ are the weights and densities of the various ingredients, at temperatures $t$, in grams and grams/cc. respectively. With this arrangement, it can be readily seen that the units of each $W/D$ factor are in cubic centimeters, which indicates that the volumes are additive.

In order to solve this equation for a 39% volume ethylene glycol solution, a concentration of 2% titanium oxide of the total composition, may be arbitrarily selected since it has been found that this quantity of titanium oxide is sufficient to impart an opaque white color to the composition. The mathematical expression can be then written with two variables $W_{LDPE}$ and $W_{PP}$, at any given temperature within the temperature range. The densities of the low density polyethylene (LDPE) and polypropylene (PP) may be readily determined from the graph of FIG. 4, while the densities of the titanium oxide and hydrated alumina will be constant at any of the temperatures in the temperature range. The weight percentages of the four primary constituents will total 100%, while the density of the composition will be the density of the 39% solution of ethylene glycol at each of the selected temperatures. If the temperatures selected are 60° F. and 180° F., the densities of the various materials may be readily determined from the graph of FIG. 4, and the simultaneous equations may then be solved. In solving the equations, let $$W_{LDPE}=13.5$$
$$W_{PP}=62.8$$

and $$W_{AL_2O_3}=19.7$$

Once the composition has been determined, the balls may be formed by injection molding or any of the various techniques being used for processing plastic materials, casting, thermoforming, compression molding, transfer molding, etc.

While the present invention contemplates a simple, easy-to-read device containing five balls, it is apparent that a temperature compensating composition can be molded into an elongated shape somewhat similar to that of a conventional glass hydrometer, which can be calibrated with a continuous scale to indicate specific gravity at the surface of the liquid. Other designs involving fulcrum points and the like are also possible. In any case the improvement over the prior art hydrometric devices is that the hydrometer will read accurately at any temperature for the liquid for which the hydrometer has been designed. Thus the plastic composition must be tailored for a particular liquid over a prescribed temperature range.

The following are examples of the composition of indicator balls.

EXAMPLE 1

A white ball for indicating the strength of the ethylene glycol solution 30% by volume in water has the same expansion and extraction characteristics as the 39% by volume concentration of ethylene glycol includes the following formulation:

|  | Gm. |
|---|---|
| TiO$_2$ concentrate 50% in LDPE | 4.0 |
| Hydrated alumina | 19.7 |
| LDPE | 13.5 |
| PP | 62.8 |
| Total | 100.00 |

This formulation was arrived at by solving the mathematical expression set forth herein above.

It is pointed out that the density characteristics of a low density polyethylene and polypropylene do vary some according to molecular weight, method of manufacture and other conditions. The particular curves shown in FIG. 4 are for relatively low molecular weight resins, although high molecular weight resins may also be used. It is also pointed out that in terms of practical limits of density, tolerance for the finished indicator balls are ±0.001. Therefore, the density for an indicator ball which is used to indicate a 39% volume ethylene glycol solution at 60 degrees would have a density within the range of 1.063 to 1.065.

It is further pointed out that antioxidants may be used in formulation to prevent thermal degradation. It is understood that the expansion-contraction characteristics of the indicator ball composition may be made more accurate by using more than two arbitrarily selected temperatures in computing the composition formulation. In some instances, it may be desirable to use an additional temperature compensating ingredient, such as high density polyethylene in combination with the polypropylene and low density polyethylene. The same mathematical model would be employed, but inasmuch as there will be three variables, three or more arbitrary temperatures will be selected, and the mathematical solution will become more complicated. As will be apparent to one skilled in the art, it is extremely important that the hydrated alumina and $TiO_2$ in the above example be finely divided and well dispersed in the plastic composition and that the LDPE and PP be homogeneously mixed. Further it is imperative that no air bubbles or voids be incorporated in the balls during the molding process. Voids will cause an apparent lowering mean density of the ball, thus destroying the accuracy of the hydrometer.

Since it is desirable to obtain an indication of the strength of the ethylene glycol solution, it is therefore desirable to have several indicator balls, each having a density corresponding substantially to the density of one of the ethylene glycol solutions illustrated in FIG. 3. Therefore, the following constitutes another example of the formulation composition.

EXAMPLE 2

A green indicator ball to indicate the strength of a 52% volume ethylene glycol solution may be formulated as follows:

|  | Gm. |
|---|---|
| $TiO_2$ concentrate 50% in LDPE | 2 |
| Phthalo cyanine green concentrate 25% in LDPE | 2 |
| Hydrated alumina | 23 |
| LDPE | 18.5 |
| PP | 54.5 |
| Total | 100 |

In using the specific gravity tester, a user will draw some fluid to be tested through the conduit 15 into the chamber 11 and observe how many, if any, of the indicator balls float. If only one ball floats, this will indicate that the strength of the ethylene glycol solution is greater than a 16.5% volume solution, but less than a 29.5% solution, or that the freezing point of the solution is between $+20°$ F. and $+5°$ F. On the other hand, if none of the balls floats, then the density of the solution will be less than the density of the least dense indicator ball indicating that the solution is less than 16.5% solution or that the freezing point is higher than $+20°$ F. If all of the balls float, than the user will be apprised that the solution is at least a 52% volume solution of ethylene glycol or that the freezing point is $-40°$ F. or lower.

Figure 5:
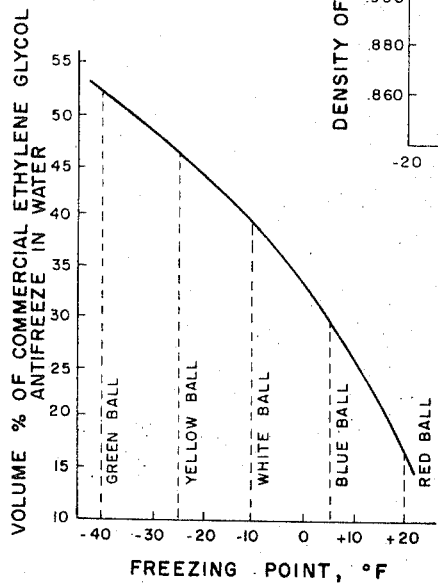
FIG. 5 is a graph which relates volume percent composition for ethylene glycol solutions to freezing point and indicates five arbitrary control points which will cover the useful range of freezing points for most applications.

Thus, by using a plurality of indicator balls each having a different specific gravity and each having temperature compensating characteristics, a wide range of indications may be obtained with respect to the strength of the ethylene glycol solution. As pointed out above, it is desirable to identify the balls by color and reference is made to the graph of FIG. 5, wherein the indicator balls are identified by color. It will be noted that the ball having the greatest density is the green ball which corresponds to the density of the 52% ethylene solution. The white ball, on the other hand has a density corresponding to the density of 39% ethylene glycol solution, while the red ball has a density corresponding to a 16.5% ethylene glycol solution. However, it is not necessary for users to associate color with the specific densities of the different indicator balls since users may readily determine the strength of the solution being tested by the number of balls that are buoyed up and float.

Although the specific formulation for the indicator balls is for determining the strengths of ethylene glycol solutions, it is also pointed out that the specific gravity tester can be used to test the strengths of other solutions by altering the amounts of the ingredients. Thus, where it is essential to obtain a relatively accurate reading with a specific gravity tester, and the density of the solution changes in response to changes in temperature, the present tester will be especially suited for making this determination.

From the foregoing description, it will be seen that I have provided a novel specific gravity tester which includes indicator balls which are temeparture compensating, thus permitting a user to obtain a relatively accurate indication even though the density of the solution being tested will vary in response to changes in temperature. Further, by forming the balls of materials which have substantially the same expansion and contraction characteristics of the solution being tested, and by using materials which are substantially chemically inert, the specific gravity tester is not only capable of giving accurate results, but has also been found to have a long life due to minimal effect thereon from the use of many different strengths and kinds of solutions which are to be tested. These polyolefins, including low density polyethylene, high density polyethylene and polypropylene, permit the indicator balls to be constructed not only of inexpensive materials, but permit the tester to be constructed of materials which have the properties not found in most prior art devices used in the testing of antifreeze solutions and the like. It will be appreciated that an indicator element made of the same or different materials may be used in testing other fluids.

Thus it will be seen that I have provided a novel specific gravity tester which is not only of simple and inexpensive construction, but one which functions in a more efficient manner than heretofore known comparable device.

It will, of course, be understood that various changes may be made in the form, details, arrangement and proportions of the various parts without departing from the scope of our invention.

What I claim is:

1. A specific gravity indicator for measuring the specific gravity of ethylene glycol having a temperature within the range of $-40°$ F. to $180°$ F. and whose specific gravity is variable in response to changes of temperature in the liquid, said indicator comprising a transparent tubular chamber formed of glass having an opening in one end thereof, means secured to the other end of said tubular chamber and adapted to draw liquid into the chamber, a plurality of indicator balls positioned within said chamber and being freely movable therein, each of said indicator balls being formed of a filler material and a polyolefin material, said filler material in said balls having a density substantially greater than the density of ethylene glycol and having expansion-contraction characteristics which are substantially unaffected in the temperature range of the ethylene glycol, said polyolefin being of a lesser density than the ethylene glycol and having substantially the same expansion-contraction characteristics of the ethylene glycol, the proportion by weight of the polyolefin material in each ball being of a different magnitude whereby each indicator ball will have a density and expansion-contraction characteristics substantially the same as that of the ethylene glycol solution of a predetermined strength at varying temperatures, the density and expansion-contraction characteristics of each indicator ball being different than that of every other indicator ball whereby a plurality of ethylene glycol solutions of different strengths may be accurately determined regardless of the temperature of solutions.

2. The specific gravity indicator as defined in claim 1 wherein said polyolefin material in each indicator ball includes a predetermined amount of low density polyethylene and a predetermined amount of polypropylene.

3. The specific gravity indicator as defined in claim 1 wherein said filler material includes hydrated alumina.

4. The specific gravity indicator as defined in claim 1 wherein said polyolefin material in each indicator ball includes a predetermined amount of low density polyethylene and a predetermined amount of polypropylene, and said filler material includes a predetermined amount of hydrated alumina, titanium oxide and a pigment.

5. The specific gravity tester as defined in claim 4 wherein each of said indicator balls has a specific gravity corresponding to a specific gravity of an ethylene glycol solution having a strength within the range of 16.5% by volume and 52% by volume solution.

6. The gravity indicator as defined in claim 4 and wherein polyolefin material includes a predetermined amount of high density polyethylene.

References Cited

UNITED STATES PATENTS 1,424,730    8/1922    Linebarger _____ 73—440

FOREIGN PATENTS 297,167    9/1928    Great Britain.

RICHARD C. QUEISSER, *Primary Examiner.*

J. K. LUNSFORD, *Assistant Examiner.*

U.S. Cl. X.R.

73—441